(12) United States Patent
Markey et al.

(10) Patent No.: US 6,659,626 B1
(45) Date of Patent: Dec. 9, 2003

(54) LIGHT FITTING

(76) Inventors: Phil A. Markey, 102 Charles-Riley Road, Trigg, WA 6029 (AU); Joe M. Dietrich, 64 Ashburton Street, East Victoria Park, WA 6101 (AU)

(*) Notice: Subject to any disclaimer, the term of this patent is extended or adjusted under 35 U.S.C. 154(b) by 0 days.

(21) Appl. No.: 10/070,494
(22) PCT Filed: Sep. 7, 2000
(86) PCT No.: PCT/AU00/01061
§ 371 (c)(1),
(2), (4) Date: Jun. 14, 2002
(87) PCT Pub. No.: WO01/18448
PCT Pub. Date: Mar. 15, 2001

(30) Foreign Application Priority Data

Sep. 7, 1999 (AU) .......................................... 47417/99

(51) Int. Cl.[7] .............................................. F21V 33/00
(52) U.S. Cl. ........................ 362/362; 362/96; 362/249; 362/226; 416/5
(58) Field of Search ................................ 362/551, 559, 362/563, 564, 565, 567, 568, 96, 249, 52, 226, 554, 287, 362; 416/5

(56) References Cited

U.S. PATENT DOCUMENTS

| | | | |
|---|---|---|---|
| 5,082,422 A | * | 1/1992 | Wang .............................. 416/5 |
| 5,558,421 A | | 9/1996 | Guastella |
| 6,036,331 A | * | 3/2000 | Acquisto ...................... 362/96 |
| 6,364,638 B1 | * | 4/2002 | Liu ........................ 417/423.15 |

* cited by examiner

Primary Examiner—Thomas M. Sember
Assistant Examiner—Anhbel Ton
(74) Attorney, Agent, or Firm—Allen, Dyer, Doppelt, Milbrath & Gilchrist, P.A.

(57) ABSTRACT

Lightfitting (10) comprises four support members or arms (12). A plurality of optical fiber strands (14) are supported by each arm (12). Each strand (14) has a proximal end adjacent the proximal end (16) of its corresponding arm (12) that is adapted to receive light from a light source (18). A length (20) at the distal end of each strand (14) extends from its corresponding arm (12). The arms (12) are rotatably supported along their lengths in a housing (28). Gear (34) is supported by the housing (28) in a manner so that it can rotate relative to the housing (28). The gear (34) meshes with respective gears (36) attached to the proximal ends of each arm (12). By attaching the light fitting (10) to a source of rotary motion such as a fan, the rotary motion is imparted to the arms (12) so that they rotate about their respective axes (24). Additionally, because of the attachment of the light fitting (10) to the fan the housing (28) and thus the arms (12) also rotate about a perpendicular axis (26). This causes the length (20) of the fibers (14) to move in a random and erratic fashion through the air thus providing an erratic lighting effect.

12 Claims, 7 Drawing Sheets

LIGHT FITTING

FIELD OF THE INVENTION

The present invention relates to a light fitting and, in particular, but not exclusively, to a light fitting adapted for attachment to a ceiling fan. The invention also relates to a lighting means comprising the light fitting.

BACKGROUND OF THE INVENTION

Many different types of lights and light fittings are currently available. Largely, these are designed specifically illuminating an area as distinct from providing some type of visual effect, although illumination is also possible. Embodiments of the present invention are concerned with providing an unusual visual effect. Currently available lights and light is fittings that produce unusual effects include LAVA LAMPS and fibre optic lamps. The lava lamp has a clear glass body filled with a carrier liquid and large globules of a second liquid. The second liquid is heating by a light source channelled though the comer liquid and moves in a random fashion through the carrier liquid. This provides a moving light effect while the lamp itself remains stationary. Common fibre optic lamps comprise in general a light source and a bundle of optical fibre strands emanating from that source. The fibres can be moved by hand or by air currents although the lamp itself again remains stationary.

SUMMARY OF THE INVENTION

It is an object of the present invention to provide an alternate form of light fitting and/or a lighting means incorporating said fitting that can produce an erratic or random lighting effect.

According to the invention there is provided a light fitting adapted for connection to a source of rotary motion comprising at least:
  a housing containing a light source;
  a support member rotatably coupled to said housing;
  a plurality of optical fibre strands supported by said support member, each strand having a proximal end adapted to receive light from said light source and a length at a distal end extending from said support member; and,
  transmission means for imparting motion to said support member from said source of rotary motion to cause said support member to rotate about one or both of a first axis extending collinearly with the length of the support member and a second non-coincident axis;
  whereby, in use, when light from a light source enters said proximal ends of said strands and motion is imparted to said support member, said length at the distal end of said strands move in a random manner to produce an erratic lighting effect.

Preferably said light fitting includes a plurality of support members each rotatably coupled to said housing about respective first axes that extend collinear with the length of said support members.

Preferably said transmission means for imparting motion includes a first gear mounted in the housing in a manner so that said first gear can rotate relative to the housing, and a plurality of second gears respective ones of which are coupled to respective proximal ends of each support member and which mesh with said first gear so that rotation of the housing relative to the first gear imparts rotational motion to the support members along said respective first axes.

Preferably said optical fibre strands are arranged in two or more groups of strands of different length with the length at the distal ends of said different groups of strands extending from the support members at different locations.

Preferably the light fitting further includes light filter means for filtering light prior to entering said optical fibre strands.

Preferably the filter means filters the light to produce transmitted light of multiple wavelengths.

Preferably said filter means is mounted to rotate relative to said support members.

Preferably said filter means is in the form of a shroud mounted about said light source.

According to the invention there is also provided a lighting apparatus including at least:
  a light source;
  at least one support member,
  a housing containing said light source and to which said at least one support member is rotatably coupled;
  a plurality of optical fibre strands supported by respective support members, each strand having a proximal end adapted to receive light from the light source and a length at a distal end extending from its respective support member,
  a motor to provide a source of rotary motion; and
  transmission means for importing motion to support members from said motor to cause said support members to rotate about one or both of respective first axes that extend collinearly with the length of each support members and a common second axis, said second axis being non-coincident with at least one of the first axes.

Preferably each support member comprises a plurality of arms joined end to end by coupling sleeves for receiving ends of adjacent arms, said sleeves also provided with a plurality of openings through which the length of the distal ends of selected optical fibre strands can extend.

BRIEF DESCRIPTION OF THE DRAWINGS

An embodiment of the present invention will now be described by way of example only with reference to the accompanying drawings in which.

DETAILED DESCRIPTION OF THE PREFERRED EMBODIMENTS

Figure 1:
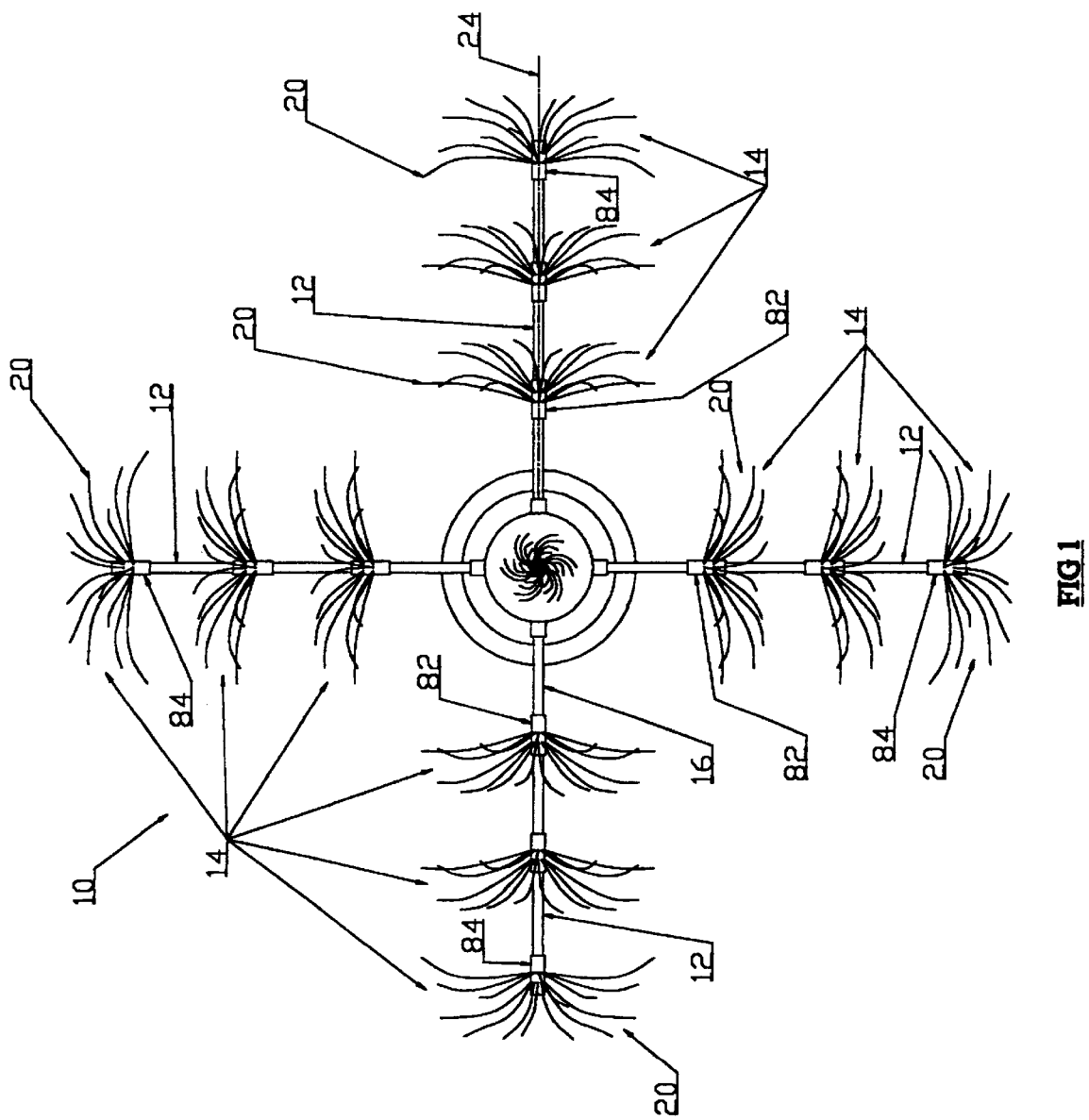
FIG. 1 is a plan view of a light fitting in accordance with the present invention.

Referring to FIGS. 1–4 of the accompanying drawings, light fitting 10 comprises at least one (in this instance four) support members or arms 12. A plurality of optical fibre strands 14 are supported by each support member/arm 12. Each strand 14 has a proximal end 15 adjacent proximal end 16 of its corresponding arm 12 that is adapted to receive light from a light source 18. A length 20 at the distal end of each strand 14 extends from its corresponding arm 12. The light fitting 10 also includes a transmission 22 for imparting motion to the arms 12 to cause them to rotate about one or both of a first axis 24 that extends collinearly with the length of the respective arms 12, and a second non-coincident axis 26. In this particular embodiment the second axis 26 extends perpendicular to the first axis 24, however, as explained below, this need not be the case. Thus, in use, when light from the light source.18 enters the proximal ends 15 of the fibre strands 14 and motion is imparted to the arms 12, the arms 12 rotate about their respective axes 24 and simultaneously rotate about the axis 26. This causes the length 20 of the fibres 14 to move in a random and erratic fashion through the air thus providing the erratic lighting effect.

Figure 3:
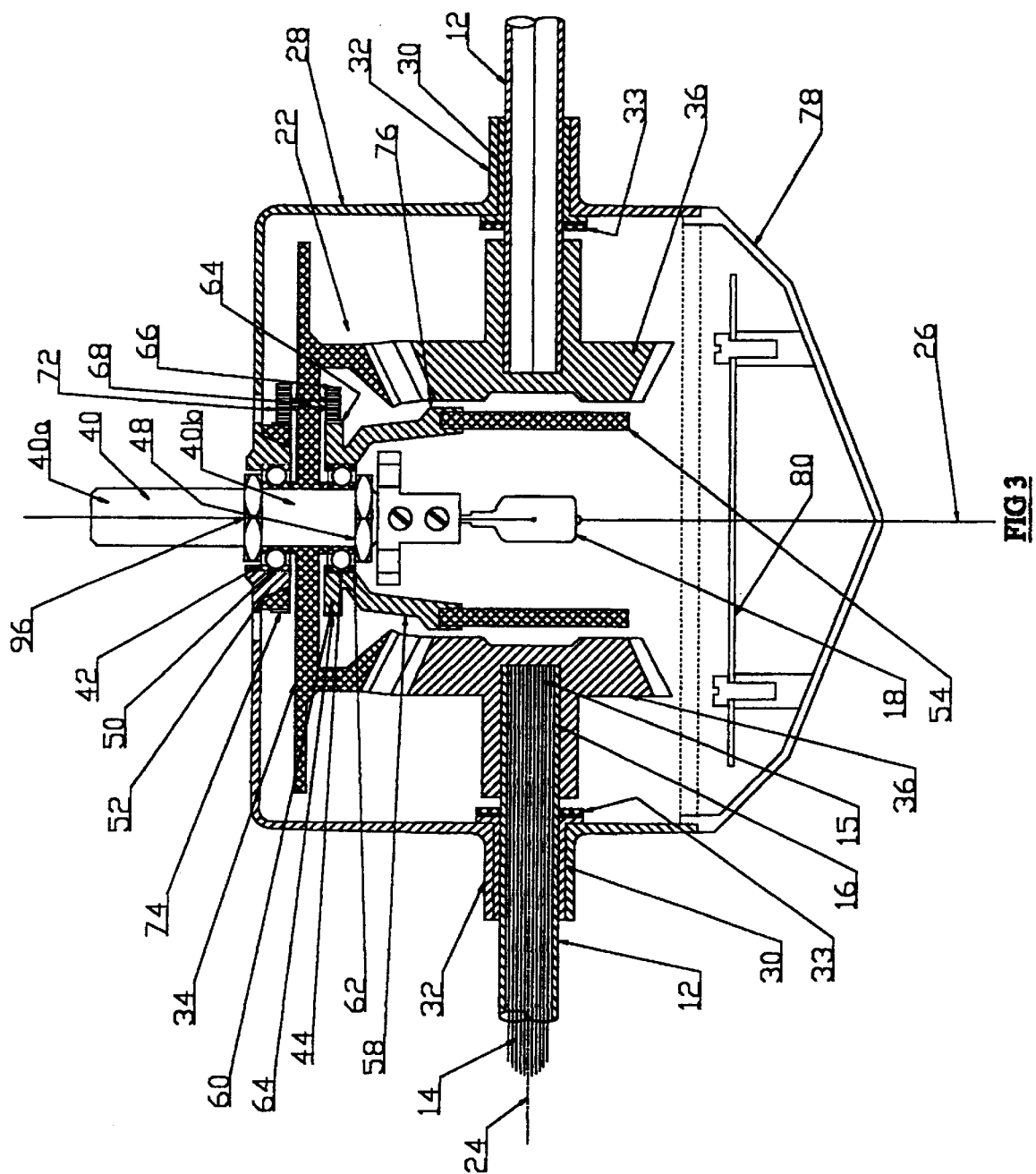
FIG. 3 is a section view of the light fitting when opened.
Figure 4:
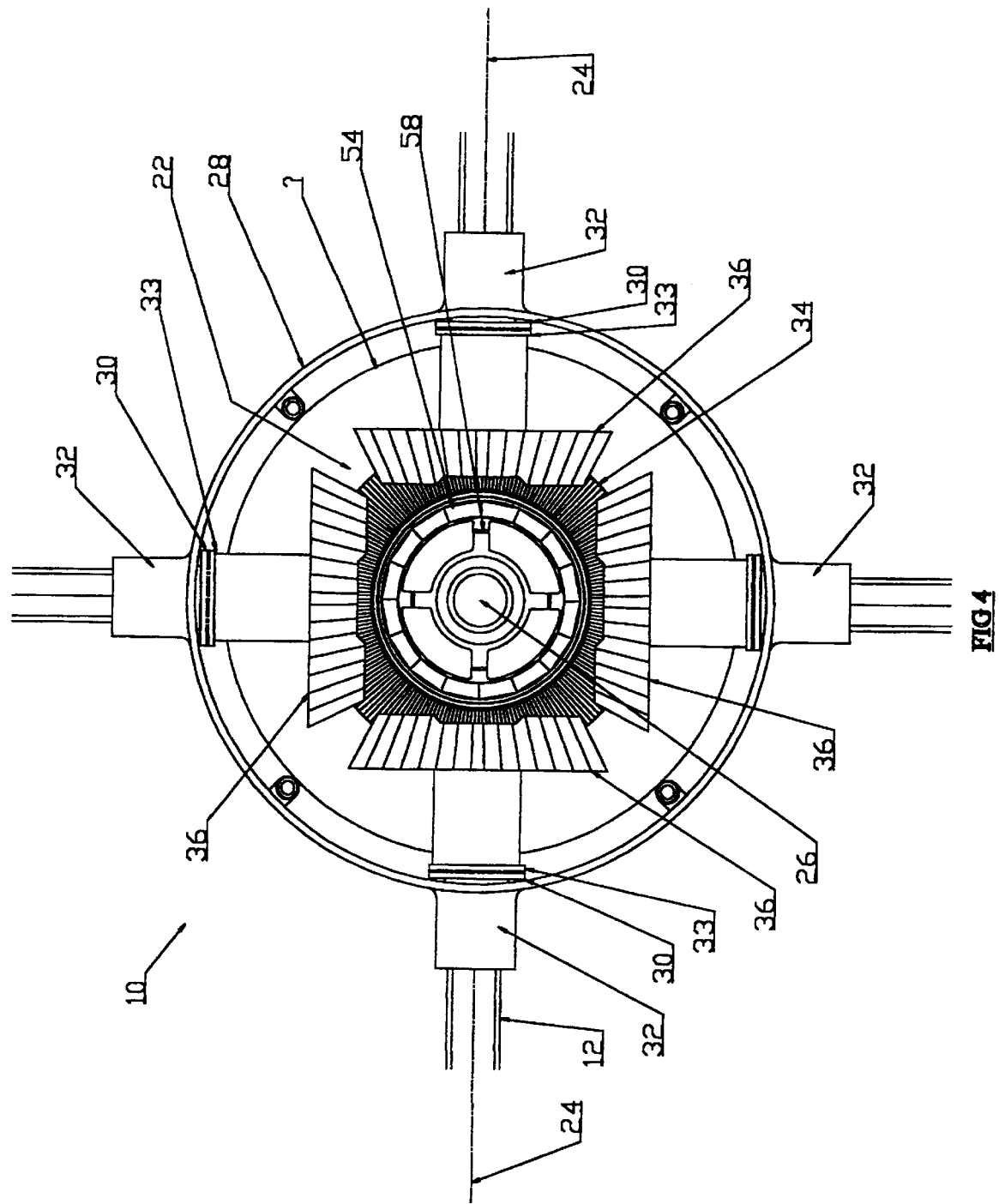
FIG. 4 is a plan view of the light fitting with its housing open.

Looking more closely at the components of the light fitting 10, it can be seen that the fitting 10 includes an outer housing 28. The housing 28 rotatably supports the arms 12 and houses the light source 18 and the transmission 22. Referring to FIGS. 3 and 4, it can be seen that the proximal end 16 of each arm 12 is held with a bearing bush 30 that in turn is retained within a corresponding radially extending socket 32 formed integrally with the housing 28. An annular circlip 33 is seated in a circumferential groove (not shown) formed about the proximal end 16 of each arm 12 radially inward from bush 30 to prevent the arms 12 from being pulled out of the housing 28.

The transmission 22 comprises a first gear 34 and a plurality of second gears 36 that mesh with the gear 34. The first gear 34 is fixed to a stationary short hollow shaft 40 that extends along the axis 26 and has an upper portion 40a that is outside the housing 28 and a lower portion 40b that is inside the housing 48. The first gear 34 is fixed to the lower part of the shaft 40b between two bearings 42 and 44, each of which has an inner race that is fixed to the shaft 40. The gear 34 and bearings 42 and 44 are prevented from axial motion along the shaft 40 by being clamped between nuts 46 and 48 each of which engages a thread (not shown) formed on the outer circumferential surface of the shaft 40. The housing 28 is fixed to outer race 50 of the bearing 42. More particularly, the outer race 50 is seated within an inwardly protecting boss 52 formed about axis 26 oh the inside of housing 28. By virtue of this coupling it will be appreciated that with the shaft 40 held stationary, the housing 28 can rotate about axis 26 relative to the gear 34 which remains stationary with the shaft 40.

Each gear 36 is fixed to the distal end 16 of a respective arm 12. The gears 36 are ranged to rotate about axes 24 that are perpendicular the axis 26. Due to the meshing of gears 34 and 36, as the housing 28 rotates relative to the first gear 34, the arms 12 are also caused to rotate about the respective axes 24. When the fitting 10 is attached to a ceiling fan F, the housing 28 is attached to a rotating part of the fan while the shaft 40 would be coupled to a stationary axle of the fan. Electric wires (not shown) are fed through the shaft 40 to provide electrical power to the light source 18.

Typically the light source 18 is a low voltage (eg 12V) light globe radiating white light. However to increase the visual appeal produced by the fitting 10 a filter 54 is placed between the light 18 and the proximal ends 15 of the fibres 14 so that the distal ends of the fibres 14 can emit light of colour or wavelength other than white. The filter 54 is in the form of a cylindrical shroud 56 that surrounds the light 18 and is supported on a driven holder 58. The holder 58 has an annular flange 60 at an upper end through which the shaft 40 passes. More particularly, outer race 62 of bearing 44 is fixed to a central hole in the flange 60 through which the shaft 40 extends. An outer circumferential surface of the flange 60 is formed with gear teeth 64 that mesh with a gear wheel 66 of a dumbbell shaped gear 68. The dumbbell gear 68 has a shaft 70 extending axially from the gear wheel 66 through the gear 34 and attached at its opposite end to a gear wheel 72. The gear wheel 72 meshes with a gear 74 formed about the outer circumferential surface of the boss 52. Gear wheels 66 and 72 are arranged to have a different diameter and, in this particular embodiment, the gear wheel 66 has a smaller diameter than the gear wheel 72. As the housing 28 rotates about shaft 40, torque is transmitted via the gears 74, 72 and 66 to the holder 58. According the filter 54 also rotates about the axis 26. Because of the difference in the diameter of the gears 72 and 66, the filter 54 rotates more quickly than the housing 28. More particularly, by virtue of this arrangement, there is relative rotation between the filter 54 and the proximal ends 15 of the fibres 14. Thus, by forming the filter 54 as a plurality of panels of different colour the wavelength of the light emitted by the fibres 14 will be seen to change in time.

The filter 54 is held conveniently by an interference or snap fit into an annular groove 76 formed at a depending end of the holder 58. This allows for convenient and easy interchanging of filters 54 to produce different visual effects.

The housing 28 is provided with a clip on-clip off lower cap 78. The. clip on-clip off characteristic can be provided by any known technique such as by providing mating annular grooves and protrusions. By making the caps 78 of clear or translucent material, the fitting 10 can also provide "white" downlighting. A standard diffuser screen or disc 80 is mounted on the inside of the cap 78 below the light 18 to further assist in dispersing white light in a downward direction.

Figure 2:
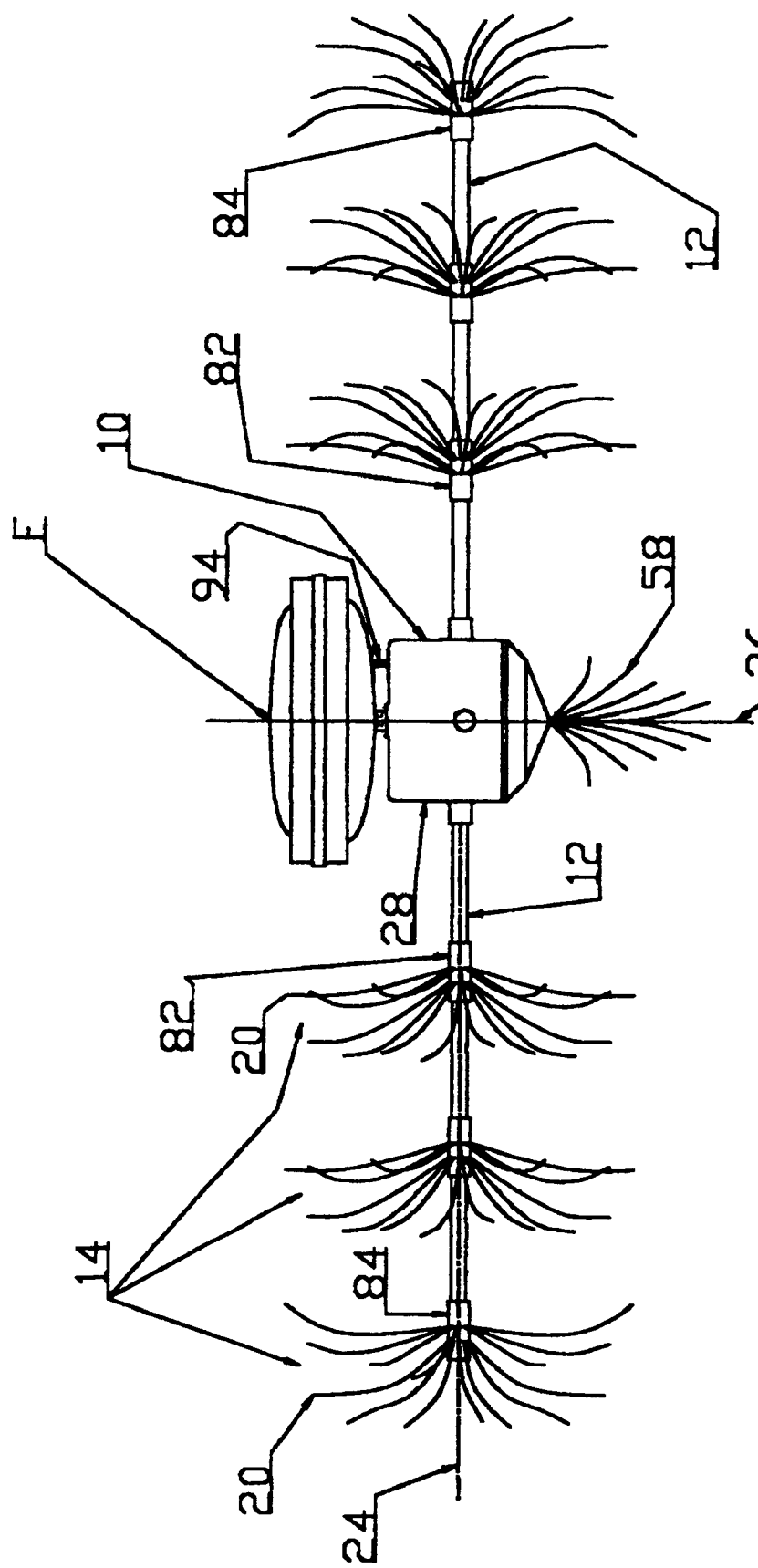
FIG. 2 is a side elevation view of the light fitting when attached to an electric fan.
Figure 5:
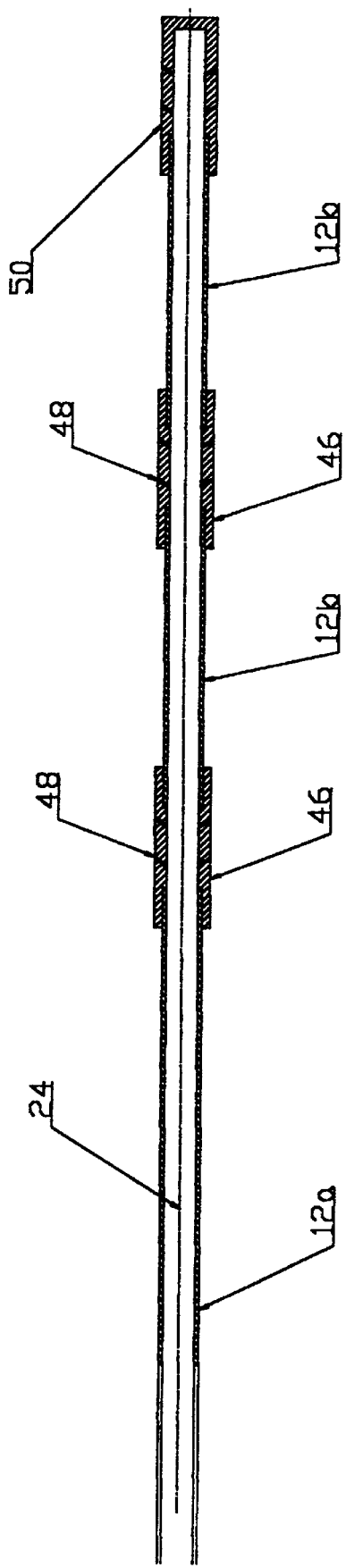
FIG. 5 is a section view of a support member incorporated in the light fitting.

As shown in FIGS. 1 and 2, the optical fibres 14 are arranged in groups of different lengths. In this way, the length 20 at the distal end of each group of stands is able to exit the arms 12 at different locations. In this embodiment, the fibres are arranged in two different groups so that they emanate from the arms 12 at different locations 82 and 84. This can be achieved by providing openings in the arms 12 through which the lengths 20 are passed. However to simplify the manufacture, as shown in FIG. 5, each arm 12 can be made from a plurality of short lengths 12A and 12B coupled together by a sleeve 86 that is provided with a plurality of openings or slits 88 through which the lengths 20 can pass. The positioning of the lengths 20 can also be effected by forming the slits 88 at an acute angle or having some of the slits 88 arranged at different acute angles.

An end sleeve 90 is provided at the distal end of arm 12 and is similarly provided with slits 88 through which the lengths 20 of the second group of strands can pass.

It is envisaged that the arms 12, (including lengths 12A, 12B) as well as the sleeves 86 and 90 will be made from an opaque material. A particularly well suited material would be aluminum tubing. In this manner, the light would emanate only from the distal ends of the lengths 20 of the strands 14.

Figure 6:
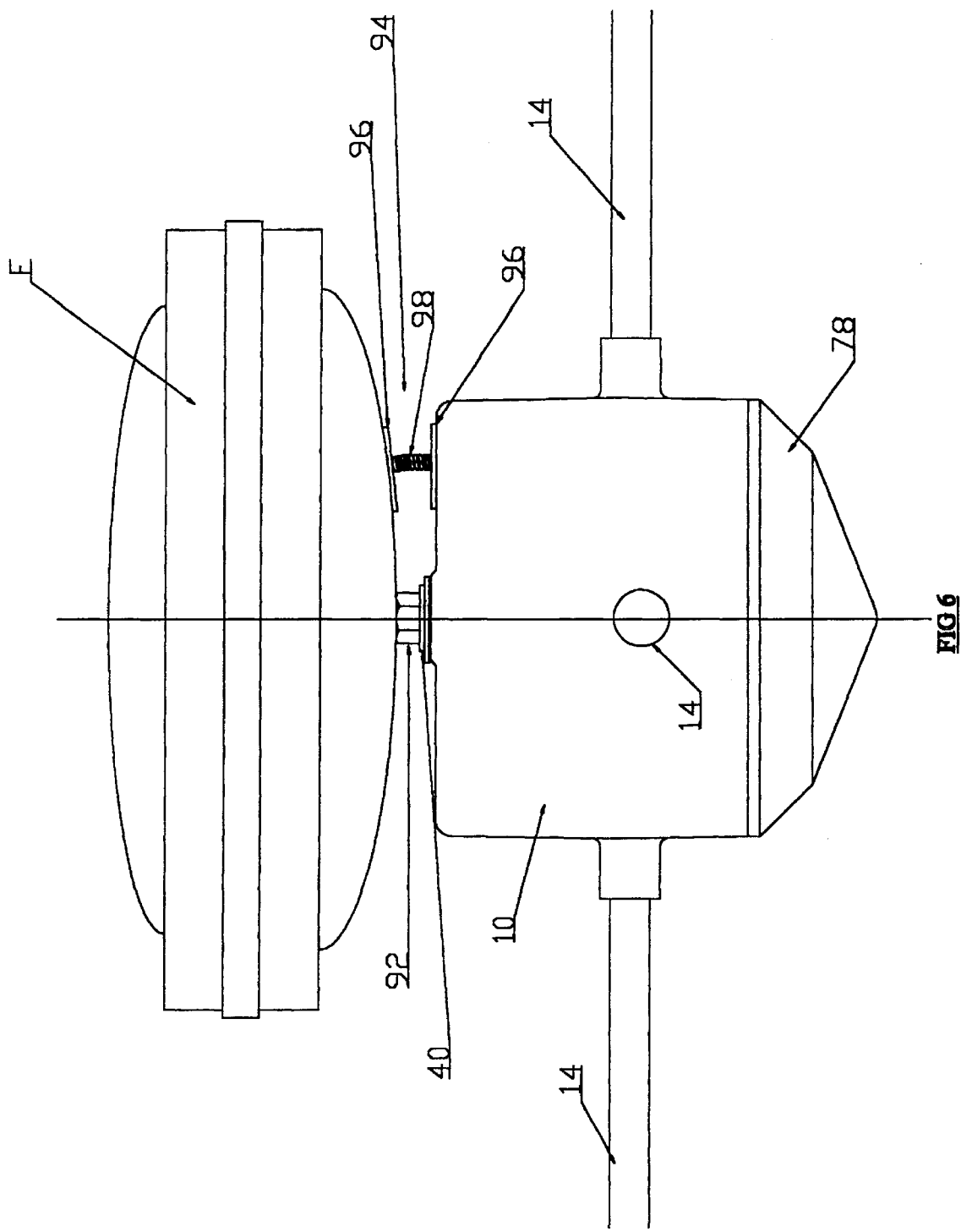
FIG. 6 illustrates a coupling for coupling the light fitting to a fan.

FIG. 6 illustrates how a fitting 10 is attached to a rotating motor of a fan F. The motor of the fan F generally has a fixed axle or another stationary fixing point to which the shaft 40 can be attached by way of a threaded sleeve 92. By this coupling, the shaft 40 is held stationary. In order to impart rotational motion to the housing 28, the coupling between the fitting 10 and the fan F also includes a resilient coupling 94. In this embodiment the resilient coupling 94 includes a pair of stick-on plates 96 of each being stuck to the outside of the housing 28 and the fan F in a mutually opposing juxtaposition, and a spring 98 which is coupled at its opposite ends the respective ones of the plates 96. This can be achieved by providing a small hole 100 in each plate 96 into which opposite ends of the spring 98 can be inserted with an interference fit.

When the fan F is operated so that its outer housing rotates, the rotational motion is transferred via the coupling 94 to the housing 28. Not only is the coupling 94 resilient but it is also frangible so that if the arms 12 is an obstacle (such as a child's arm) the coupling 94 can be broken by the spring 98 pulling out of one or both of the plates 96 thus decoupling torque from the fan F to the housing 28. The coupling 94 can be easily reinstated by simply inserting opposite ends of the spring 98 back into the holes 100 of the plates 96.

In yet a further embodiment which is not illustrated, instead of coupling the fitting 10/housing 28 to a fan F, a separate motor (not shown) can be provided for providing the rotational motion to form a stand alone lamp.

Figure 7:
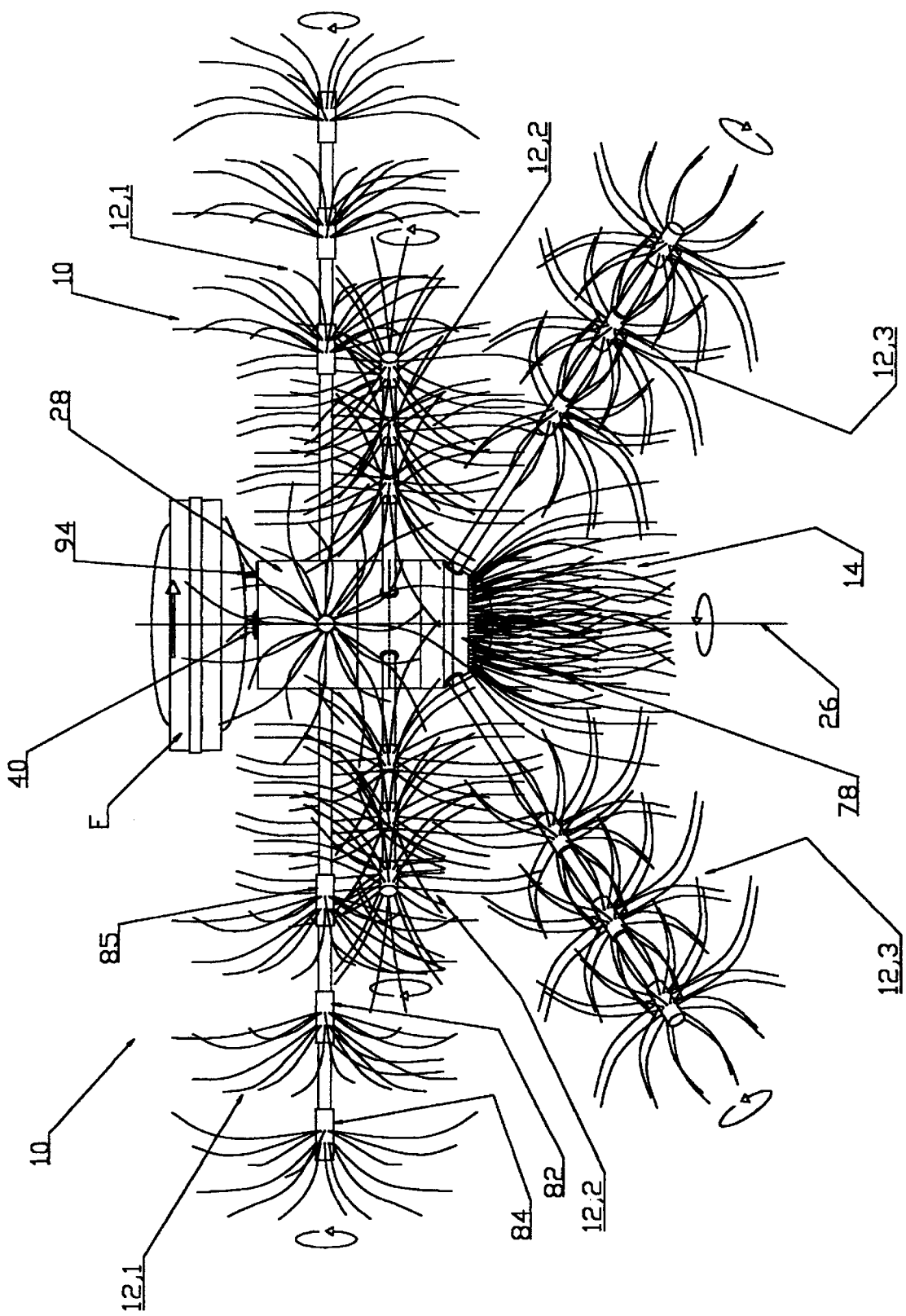
FIG. 7 is a representation of a second embodiment of the light fitting.

FIG. 7 illustrates a further embodiment of the light fitting 10 having a plurality (three) tiers or layers of arms $12_1$, $12_2$ and $12_3$. To accommodate the three tiers of arms $12_1$–$12_3$ the housing 28 is extended in its axial length. The first tier of arms 12, are arranged in an identical manner to the arms 12 depicted in FIGS. 1–5. The second tier of arms 122 are arranged in a like fashion to the first tier 12, but are offset about axis 26 by 30° relative to arms $12_1$. The arms $12_2$ are provided at their proximal ends with gears (not shown) that mesh with gears 36 of arms 12, to provide rotational motion to arms 122. However, the gearing four arms $12_2$ can be arranged so that they rotate in the opposite direction to arms $12_1$.

The third layer or tier of arms $12_3$ extend at an acute angle to both the axis 26 and the axes 24 of the arms $12_1$, $12_2$. Arms $12_3$ also rotate about selective axes coincident with their length by way of similar gearing arrangement to arms $12_1$ and $12_2$. The arms $12_3$ are offset by a further 300 about axis 26 so that angularly there is one arm $12_2$ and one arm $12_3$ between adjacent arms $12_1$.

Further, in the light fitting 10' the fibres 14 held in any one of the arms $12_1$–$12_3$ are arranged into three groups so as to emanate from the arms at three different locations, 82, 84 and 85. Additionally the end caps 78 is provided with a plurality of downwardly depending fibres 14'.

Now that an embodiment of the invention has been described in detail it will be apparent to those skilled in the relevant arts that numerous modifications and variations may be made without departing from the basic inventive concepts. For example, any number of arms 12 can be used in the light fitting 10. Additionally, while the strands 14 are illustrated as emanating from the arms 12 at two (FIGS. 1 & 2) or three (FIG. 7) different locations, further groups of strands can be provided so as to emanate from more locations along the arms 12. If desired, the arms 12 can be made from a transparent or translucent material so that light passing along the optical fibre strands can be visualised along the arms 12. Additionally, any type of gearing arrangement or other drive arrangement can be provided for imparting motion to the arms 12.

Further possible modifications and variations include making different arms 12 of different length and/or different strands 14 of different length. In addition, a heat sensor/power shut off circuit can be provided within the housing 28 to shut off power to the light 18 if the temperature within the housing 28 exceeds a nominal value. Ventilation holes (not shown) can be provided within the housing 28 to assist in dissipation of heat from within the housing 28. Preliminary tests have shown that when the housing 28 is rotating the rotary motion causes sufficient circulation of air within the housing 28 to prevent the temperature from exceeding normal safe operating temperatures. Indeed test further show that even when the housing 28 does not rotate the ventilation holes provide sufficient heat dissipation to prevent an overheat situation occurring in most circumstances.

The filter 54 can be configured in many different ways. For example, the filter can be split up into four quadrants each of which filters a different wavelength of light, for example red, blue, green, yellow. Alternately, the filter can be segmented into a large number (for example, sixteen) axial bands which alternate in two or more colours.

Also, an adjustable gearbox or other gear train can be provided coupling the holder 58 to the gear 74 to allow adjustment of the rate of rotation of the filter 54 relative to the arms 12.

All such modifications and variations together with others that would be obvious to a person of ordinary skill in the art are deemed to be within the scope of the present invention the nature of which is to be determined from the above description and the appended claims.

What is claimed is:

1. A light fitting adapted for connection to a source of rotary motion comprising at least:
   a housing containing a light source;
   a support member rotatably coupled to said housing;
   a plurality of optical fibre strands supported by said support member, each strand having a proximal end adapted to receive light from said light source and a length at a distal end extending from said support member; and,
   transmission means for imparting motion to said support member from said source of rotary motion to cause said support member to rotate about one or both of a first axis extending collinearly with the length of the support member and a second non-coincident axis;
   whereby, in use, when light from a light source enters said proximal ends of said strands and motion is imparted to said support member, said length at the distal end of said strands move in a random manner to produce an erratic lighting effect.

2. The light fitting according to claim 1 further including a plurality of support members each rotatably coupled to said housing about respective first axes that extend collinear with the length of said support members.

3. The light fitting according to claim 2 wherein said transmission means for imparting motion includes a first gear mounted in the housing in a manner so that said first gear can rotate relative to the housing, and a plurality of second gears respective ones of which are coupled to respective proximal ends of each support member and which mesh with said first gear so that rotation of the housing relative to the first gear imparts rotational motion to the support members along said respective first axes.

4. The light fitting according to claim 1, wherein said optical fibre strands are arranged in two or more groups of strands of different length with the length at the distal ends of said different groups of strands extending from the support members at different locations.

5. The light fitting according to claim 1, further including light filter means for filtering light prior to entering said optical fibre strands.

6. The light fitting according to claim 5 wherein the filter means filters the light to produce transmitted light of multiple wavelengths.

7. The light fitting according to claim 6 wherein said filter means is mounted to rotate relative to said support members.

8. The light fitting according to claim 7 wherein said filter means is in the form of a shroud mounted above said light source.

9. The light fitting according to claim 1, wherein each support member comprises a plurality of arms joined end to end by coupling sleeves for receiving ends of adjacent arms, said sleeves also provided with a plurality of openings through which the length of the distal ends of selected optical fibre strands can extend.

10. A lighting apparatus including at least:
- a light source;
- at least one support member;
- a housing containing said light source and rotatably supporting said at least one support member;
- a plurality of optical fibre strands supported by respective support members, said strand having a proximal end adapted to receive light from the light source and a length at a distal end extending from its respective support member; and
- means for importing motion to support members to rotate the support members about one or both of respective first axes that extend collinearly with the length of each support member and a common second axis, said second axis being non-coincident with at least one of the first axes.

11. The lighting apparatus according to claim 10 wherein said optical fibre strands are arranged in two or more groups of strands of different length with the length at the distal ends of said different groups of strands extending from the support members at different locations.

12. The light apparatus according to claim 10 wherein said support member comprises a plurality of arms joined end to end by coupling sleeves for receiving ends of adjacent arms, said sleeves also provided with a plurality of openings through which the length of the distal ends of selected optical fibre strands can extend.

* * * * *